United States Patent [19]

Anderson et al.

[11] Patent Number: 5,616,673

[45] Date of Patent: Apr. 1, 1997

[54] PROCESS FOR PRODUCTION OF LOW VISCOSITY LOW SILANOL CONTENT SILICONE FLUIDS

[75] Inventors: Patricia P. Anderson, Williamstown, Mass.; Dennis P. Thompson, Clifton Park, N.Y.

[73] Assignee: General Electric Company, Waterford, N.Y.

[21] Appl. No.: 572,232

[22] Filed: Dec. 13, 1995

[51] Int. Cl.[6] .................................................. C08G 77/08
[52] U.S. Cl. ................... 528/23; 528/14; 528/16; 528/18; 556/451; 556/453; 556/450; 556/456
[58] Field of Search ................... 528/23, 14, 16, 528/18; 556/451, 453, 456, 450

[56] References Cited

U.S. PATENT DOCUMENTS

| | | |
|---|---|---|
| 3,853,932 | 12/1974 | Razzano ................................ 556/459 |
| 3,853,934 | 12/1974 | Sicilliano et al. . |
| 4,599,537 | 7/1986 | Yamashita . |
| 4,792,596 | 12/1988 | Ottlinger et al. . |
| 4,831,174 | 5/1989 | Elms . |

*Primary Examiner*—Melvyn I. Marquis
*Attorney, Agent, or Firm*—Kenneth S. Wheelock

[57] ABSTRACT

Use of a certain class of acid washed clays enables a fixed bed process for the production of very low viscosity low silanol content silicone fluids to be produced in a fixed bed single reactor process.

18 Claims, No Drawings

PROCESS FOR PRODUCTION OF LOW VISCOSITY LOW SILANOL CONTENT SILICONE FLUIDS

FIELD OF THE INVENTION

The present invention relates to a single fixed bed process for the production of very low viscosity silicone fluids from high silanol fluid feeds.

BACKGROUND OF THE INVENTION

Polydiorganosiloxane fluids having a low silanol content exhibit benefits such as improved viscosity stability at elevated temperatures as a consequence of improved thermal stability. Reaction with a silylating agent such as hexamethyldisilazane provides a method of removing silanol chainstopping groups. In contrast the direct production of low silanol content polydiorganosiloxane fluids from silanol containing feeds is not as well understood.

The primary chemical route to tri-organosilyl endblocked polydiorganosiloxanes involves the equilibration or polymerization of cyclopolydiorganosiloxanes, silanol chain-stopped linear polydiorganosiloxanes, or mixtures thereof with an appropriate chainstopping agent such as hexaorganodisiloxane or a short chain length polydiorganosiloxane fluid in the presence of a catalyst. Suitable catalysts for this polymerization or equilibration include both acids and bases. The product of this process is a mixture of the desired product contaminated by a lesser amount of the starting material(s).

The earliest catalysts used for this process were soluble acids or bases. Because the catalytic agent was soluble, deactivation or separation of the catalyst from the reaction products presented difficulties in downstream purification. Further, very strong acid catalysts such as sulfuric acid created problems with undesirable side reactions, such as cleavage of the organic substituents from the silicone in the polyorganosiloxane.

An early solution to the problems presented by soluble catalysts, was the use of solid catalysts. This is accomplished by resorting to the practices of heterogeneous catalysis and bonding the catalyst to a support, or alternatively using a solid material having catalytic properties, e.g. ion exchange resins. As a practical matter, ion exchange resins have been unsatisfactory from the standpoint of requiring long residence times and in addition are fairly expensive by comparison to alternative catalytic materials such as sulfuric acid and the like.

Both acid treated carbon black and acid treated clays have been used in fixed bed processes. These materials suffer from the drawback that practical conversions require fairly high temperatures. Depending on the product desired and the equilibrium relationships involved this is a greater or lesser drawback. These processes utilized temperatures ranging anywhere from 85° to 200° C. and were frequently operated at reduced pressures ranging from 5 to 200 mm Hg, particularly in the case of acid treated clays which were used in powdered, as opposed to granular, forms, because of pressure drop problems across the catalyst bed. At the lower temperatures, side reactions were minimized, but low pressures, i.e. partial vacuums, have been necessary to produce low silanol equilibrates from reactants containing high levels of silanol.

In order to reduce the problems created by increasing temperature to increase the reaction rate, the use of two beds in series was implemented (Siciliano et al. U.S. Pat. No. 3,853,934). When two fixed beds are used in series, it became possible to use less active materials such as acid treated clays as the catalysts for the equilibration polymerization reaction. The reduced activity of the acid treated hydroaluminum silicate clay catalyst was partially compensated for by operating both catalyst beds at temperatures ranging from 150° to 200° C. Early developers of these processes generally were not particularly concerned with the silanol content of the resulting product nor whether the product was primarily linear or contaminated with a significant amount of branched product.

Later developments teaching a complete reversal of some of the preferred process parameters, e.g. a granular catalyst particles as opposed to finely divided catalyst particles, resulted in process improvements: 1) reducing the temperature range of operation to 100° to 150° C. and 2) an essentially water-free product (Elms, U.S. Pat. No. 4,831, 174). Even with these improvements, the process requires two fixed beds operated in series when utilizing acid treated clays.

SUMMARY OF THE INVENTION

The process of the present invention provides a process for producing low viscosity silicone fluids consisting essentially of:

1) feeding a silicone fluid or mixture of silicone fluids to a single fixed bed reactor containing a granular, acid washed clay catalysts, 2) contacting the catalyst with the silicone fluid, and 3) recovering a low viscosity silicone fluid therefrom.

The process of the invention is particularly useful to processing silicone fluids that are mixtures of cyclic siloxanes of the type i) $(R_2SiO)_n$, with linear polysiloxane diols of the type ii) $HO(SiR_2O)_xH$, and with a chainstopper of the type iii) $R_3SiO(SiR_2O)_zSiR_3$, where n and x are equal to or greater than 3, z is equal to or greater than zero, and R in i), ii) and iii) is a one to forty carbon atom monovalent hydrocarbon radical that is be independently selected, to produce low viscosity permethylated fluids; or mixtures of cyclic siloxanes of the type i) $(HRSiO)_n$ or $(R_2SiO)_n$, with linear hydrogen siloxanes of the type ii) $HR_2SiO(SiRCH_3O)_ySiHR_2$, or $R_3SiO(SiHCH_3O)_ySiR_3$ and with a chain stopper of the type iii) $R_3SiO(SiR_2O)_zSiR_3$ or $HR_2SiO(SiR_2O)_zSiR_2H$, where n and y are equal to or greater than 3, z is equal to or greater than zero, and R in i), ii), and iii) is a one to forty carbon atom monovalent hydrocarbon radical that is be independently selected to produce low viscosity hydride fluids.

The process of the present invention produces substantially linear siloxanes having the formula:

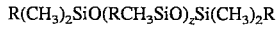

where R is a one to forty carbon atom monovalent hydrocarbon radical or hydrogen, z is a number greater than zero.

DETAILED DESCRIPTION OF THE INVENTION

The present invention provides for a continuous process for the production of low viscosity, low silanol content silicone fluids by means of a fixed bed process utilizing a single isothermal reactor.

The process of the present invention consists essentially of:

1) feeding a silicone fluid or a mixture of silicone fluids to a single fixed bed reactor that contains a granular acid washed clay catalyst, 2) contacting the catalyst with the silicone fluid, and 3) recovering a low viscosity silicone fluid therefrom.

The process is generally accomplished in a single pass through the reactor. The use of the granular acid washed clay catalyst enables the use of lower temperatures than heretofore possible to effect the conversion of the present process, temperatures ranging from about 70° to about 150° C. When permethylated fluids are used as the feedstock to the reactor, the temperature preferably ranges from about 90° to about 130° C., more preferably from about 100° to about 120° C., and most preferably from about 110° to about 120° C. When it is desired to process hydride containing silicone fluids the temperature ranges from about 70° to about 130° C., preferably from about 85° to about 120° C., and most preferably from about 90° to about 100° C.

The clay catalysts employed by the process of the present invention are montmorillonite clays that have been treated with sulfuric acid. The residual acidity may be neutralized by about 14 mg KOH per gm of acid washed clay as determined by a phenolphthalein endpoint. The ignition loss at 105° C. is about 14 weight percent. The surface area of these acid washed clays as determined by a BET surface area measurement is 400 m$^2$/g, with an apparent bulk density of about 50 lbs./cu. ft. The surface areas of smectite clay catalysts, montmorillonite being one example, can vary from a low of about 50 to a high of about 500 m$^2$/g. These materials are commercially supplied by Engelhard Corporation and are available in a variety of mesh sizes, the different mesh sizes having different catalog numbers. Applicants define granular to be a Tyler mesh ranging from about 5 to about 50. A particularly important feature of the use of granular as opposed to powdered forms of the catalyst is the ability to run the process with less pressure drop across the fixed bed of catalyst.

The process of the present invention is conducted at space velocities ranging from about 0.1 parts by weight of silicone fed per hour per parts by weight of catalyst (W/Hr/W) to about 100 W/Hr/W, preferably from about 0.5 W/Hr/W to about 25 W/Hr/W, more preferably from about 0.75 W/Hr/W to about 10 W/Hr/W, and most preferably from about 0.75 to about 5 W/Hr/W.

Another important feature of the present invention is the fact that the process may be operated without the imposition of any external temperature gradients across the fixed bed of catalyst.

The process of the present invention is suited for the conversion of two different silicone fluid streams:

I. a mixture of cyclic siloxanes of the type i) $(R_2SiO)_n$ linear polysiloxane diols of the type ii) $HO(SiR_2O)_xH$, and a chainstopper of the type iii) $R_3SiO(SiR_2O)_zSiR_3$, where n and x are equal to or greater than 3, z is equal to or greater than zero, and R is a one to forty carbon atom monovalent hydrocarbon radical, that may be independently selected between the three constituents of mixture I, producing a low viscosity permethylated fluid; or II. a mixture of cyclic siloxanes of the type i) $(HRSiO)_n$, $(R_2SiO)_n$ or mixtures thereof, with linear hydrogen siloxanes of the type ii) $HR_2SiO(SiRCH_3O)_ySiHR_2$, $R_3SiO(SiHCH_3O)_ySiR_3$, or mixtures thereof;

and with a chain stopper of the type iii) $R_3SiO(SiR_2O)_zSiR_3$, $HR_2SiO(SiR_2O)_zSiR_2H$ or mixtures thereof where n and y are equal to or greater than 3, z is equal to or greater than zero, and R in i), ii), and iii) is a one to forty carbon atom monovalent hydrocarbon radical that is be independently selected between the three constituents of mixture II producing a low viscosity hydride fluid; whereby the product resulting from the process of the present invention has a viscosity below 50 cps at 25° C. or may be devolatilized to a product having a viscosity of 50 cps or less and in the case of the permethylated fluids a silanol content below about 600 ppm, preferably below about 400 ppm, more preferably below about 200 ppm and most preferably below about 100 ppm. The product resulting from the process of the present invention is substantially a linear siloxane or a mixture of substantially linear siloxanes having the formula:

$$R(CH_3)_2SiO(RCH_3SiO)_zSi(CH_3)_2R$$

where R is a one to forty carbon atom monovalent hydrocarbon radical or hydrogen, z is a number greater than zero whereby the product has a viscosity less than 50 centipoise at 25° C. after devolatilization. When R is methyl, the fluid is said to be permethylated. By substantially linear, Applicants define substantially to mean greater than 70 mole percent linear species present in a mixture, preferably greater than 75 mole percent linear species present in a mixture, more preferably greater than 80 mole percent linear species present in a mixture, and most preferably greater than 85 mole percent linear species present in a mixture.

Devolatilization is a means of reducing the volatiles content of the product fluid and is a distillation procedure that may be accomplished at temperatures above about 100° C., preferably above about 150° C., more preferably above about 200° C., and most preferably above about 250° C.; preferably conducted under vacuum conditions ranging from 0.1 mm Hg to 750 mm Hg.

When the reactants are selected such that the feed to the process contains at least 3 weight percent M groups, M being defined as a monofunctional siloxy group having only one position attachable to a siloxane polymer, and the silanol content of the feed is below about 8,000 ppm silanol groups, it is possible to produce low silanol content products, i.e. below 600 ppm silanol, by the process of the present invention. With at least 6 weight percent M groups and when the precursor content is 4,500 ppm silanol or below, it is possible to produce a permethylayted fluid having a residual silanol content below 200 ppm.

All United States patents referenced herein are herewith and hereby specifically incorporated by reference

EXPERIMENTAL

Experiment 1a

Synthesis of less than 50 cps dimethyl siloxane fluid equilibrate

A mixture of approximately 56 weight percent cyclic polydimethylsiloxanes, 27 weight percent linear polydimethylsiloxane diols, and 17 weight percent hexamethyldisiloxane having a total silanol content of 3,700 ppm was pumped at the rate of 2.2 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 20 minutes. After cooling to room temperature the product had a viscosity of 8.6 cps at 25° C. and a silanol content of 100 ppm. Heating the product to 150° C. in an open container for one hour resulted in a loss of volatile materials of 31.0. weight percent.

Experiment 1b

The same mixture as in experiment 1a was pumped at somewhat faster rate, 2.7 g/min, under the same conditions The product resulting had a viscosity of 9.3 cps, 200 ppm silanol and a volatiles content of 30.5 weight percent.

Experiment 1c

A mixture of approximately 69.5 weight percent cyclic polydimethylsiloxanes, 13.5 weight percent linear polydimethylsiloxane diols, and 17 weight percent hexamethyldisiloxane having a total silanol content of 1,900 ppm was pumped at the rate of 3.4 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 13 minutes. After cooling to room temperature the product had a viscosity of 9.0 cps at 25° C. and a silanol content of 100 ppm. Heating the product to 150° C. in an open container for one hour resulted in a loss of volatile materials of 33.6 weight percent.

Experiment 2

Synthesis of less than 5 cps polydimethylsiloxane fluid equilibrate

A mixture of approximately 60 weight percent hexamethyldisiloxane, 26 weight percent liner polydimethylsiloxane diols, and 14 weight percent cyclic polydimethylsiloxanes having a total silanol content of 3,600 ppm was passed over a fixed bed of Filtrol F-24 catalyst, in the same amount as example(s) 1. The resulting product had a viscosity of 1.4 cps at 25° C., a silanol content of 50 ppm, and a volatiles content of 93.3 weight percent. This product was subsequently devolatilized to yield a fluid having a viscosity of 5.9 cps at 25° C., and 56 weight percent volatiles.

Experiment 3a

Synthesis of less than 50 cps polydimethylsiloxane fluid equilibrate

A mixture of approximately 63 weight percent cyclic polydimethylsiloxanes, 30 weight percent linear polydimethylsiloxane diols, and 7 weight percent hexamethyldisiloxane having a total silanol content of 4,200 ppm was pumped at the rate of 2.5 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 20 minutes. After cooling to room temperature the product had a viscosity of 28 cps at 25° C. and a silanol content of less than 100 ppm. Heating the product to 150° C. in an open container for one hour resulted in a loss of volatile materials of 16.5 weight percent.

Experiment 3b

A mixture of approximately 33 weight percent cyclic polydimethylsiloxanes, 60 weight percent linear polydimethylsiloxane diols, and 7 weight percent hexamethyldisiloxane having a total silanol content of 8,400 ppm was pumped at the rate of 1.1 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 40 minutes. After cooling to room temperature the product had a viscosity of 27 cps at 25° C. and a silanol content of 230 ppm. Heating the product to 150° C. in an open container for one hour resulted in a loss of volatile materials of 16.0 weight percent. Experiment 3c mixture of approximately 33 weight percent cyclic polydimethylsiloxanes, 60 weight percent linear polydimethylsiloxane diols, and 7 weight percent hexamethyldisiloxane having a total silanol content of 8,400 ppm was pumped at the rate of 2.3 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 19 minutes. After cooling to room temperature the product had a viscosity of 27 cps at 25° C. and a silanol content of 370 ppm. Heating the product to 150° C. in an open container for one hour resulted in a loss of volatile materials of 18.8 weight percent.

Experiment 4

Synthesis of less than 100 cps polydimethylsiloxane fluid equilibrate

A mixture of approximately 65 weight percent cyclic polydimethylsiloxanes, 31 weight percent linear polydimethylsiloxane diols, and 4 weight percent hexamethyldisiloxane having a total silanol content of 2,800 ppm was pumped at the rate of 2.1 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 21 minutes. After cooling to room temperature the product had a viscosity of 47 cps at 25° C. and a silanol content of 600 ppm. Heating the product to 150° C. in an open container for one hour resulted in a loss of volatile materials of 13.9 weight percent. This example demonstrates that as the viscosity increases the residual silanol content of the product increases.

Experiment 5

Synthesis of Hydrogensiloxane (hydride fluid)

A mixture of 83.5 weight percent octamethylcyclotetrasiloxane, 10 weight percent of a polymethylhydrogensiloxane and 6.5 weight percent of hexamethyldisiloxane was pumped at the rate of 2.8 g/min. through a preheater at 120° C. followed by a single pass through a packed column containing 110 g of Filtrol F-24® acid washed clay catalyst at a temperature of 110° to 120° C. The pumping rate and the column length was such that the residence time in the column was approximately 16 minutes. After cooling to room temperature the product had a viscosity of 23 cps at 25° C. and 0.17 weight percent hydride by Fourier Transform Infrared Spectroscopy. Heating the product to 150° C. in an open container for one hour resulted in a loss of volatile materials of 11.5 weight percent.

Experiment 6

Batch preparation of Hydrogensiloxane

To a dry kettle, 300 g of a mixture containing 83.5 weight percent octamethylcyclotetrasiloxane, 10 weight percent of a polymethylhydrogensiloxane and 6.5 weight percent of hexamethyldisiloxane was charged. To this mixture was added 1.5 g of carbon black and 0.3 g sulfuric acid as concentrated sulfuric acid. The reaction mixture was heated to 50° C. for two hours. The temperature was then raised to 95° C. and held at that temperature for an additional two 30 hours. The reaction product was cooled to room temperature and filtered through Celite® to remove the carbon black and the residual acid. The product had a viscosity of 25 cps at 25° C. and a hydride content of 0.17 weight percent. In contrast to the previous examples, the product prepared in this example was prepared by a batch process as opposed to a continuous process.

Having described the invention that which is claimed is:

1. A process for producing low viscosity silicone fluids consisting essentially of:
   1) feeding a silicone fluid or mixture of silicone fluids to a single fixed bed reactor containing a granular, acid treated clay catalyst having a Tyler mesh from about 5 to about 50,
   2) contacting the catalyst with the silicone fluid, and
   3) recovering a low viscosity silicone fluid therefrom, said silicone fluid having the formula:

   $R(CH_3)_2SiO(RCH_3SiO)_zSi(CH_3)_2R$ wherein z is a number greater than zero, whereby when R is methyl said silicone fluid has a silanol content below about 600 ppm.

2. The process of claim 1 wherein said silicone fluid fed to said reactor comprises:
   a mixture of cyclic siloxanes of the formula
   i) $(R_2SiO)_n$,
   linear polysiloxane diols of the formula
   ii) $HO(SiR_2O)_xH$, and
   a chainstopper of the formula
   iii) $R_3SiO(SiR_2O)_zSiR_3$, where n and x are equal to or greater than 3, z is equal to or greater than zero, and each R in i), ii) and iii) is a one to forty carbon atom monovalent hydrocarbon radical that is independently selected.

3. The process of claim 1 wherein said silicone fluid fed to said reactor comprises:
   i) a mixture of cyclic siloxanes selected from the group consisting of
      $(HRSiO)_n$, $(R_2SiO)_n$, and mixtures thereof;
   ii) linear hydrogen siloxanes selected from the group consisting of:
      $HR_2SiO(SiRCH_3O)_ySiHR_2$, $R_3SiO(SiHCH_3O)_ySiR_3$ and mixtures thereof; and
   iii) a chain stopper selected from the group consisting of
      $R_3SiO(SiR_2O)_zSiR_3$, $HR_2SiO(SiR_2O)_zSiR_2H$, and mixtures thereof;

where each n and each y are equal to or greater than 3, each z is equal to or greater than zero, and R in i), ii), and iii) is a one to forty carbon atom monovalent hydrocarbon radical that is independently selected.

4. The process of claim 2 conducted at a temperature ranging from about 70° to about 150° C.

5. The process of claim 3 conducted at a temperature ranging from about 70° to about 130° C.

6. The process of claim 4 wherein said acid treated clay is montmorillonite.

7. The process of claim 5 wherein said acid treated clay is montmorillonite.

8. The process of claim 6 wherein said low viscosity silicone fluid has a viscosity below about 50 centipoise at 25° C.

9. The process of claim 7 wherein said low viscosity silicone fluid has a viscosity below about 50 centipoise at 25° C.

10. A process for producing low viscosity silicone fluids comprising:
    1) feeding a silicone fluid or mixture of silicone fluids to a single fixed bed reactor containing a granular, acid treated clay catalyst having a Tyler mesh from about 5 to about 50,
    2) contacting the catalyst with the silicone fluid, and
    3) recovering a low viscosity silicone fluid therefrom, said silicone fluid having the formula:

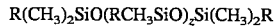
    $R(CH_3)_2SiO(RCH_3SiO)_zSi(CH_3)_2R$ wherein z is a number greater than zero, whereby when R is methyl said silicone fluid has a silanol content below about 600 ppm.

11. The process of claim 10 wherein said silicone fluid fed to said reactor comprises:
    a mixture of cyclic siloxanes of the formula
    i) $(R_2SiO)_n$,
    linear polysiloxane diols of the formula
    ii) $HO(SiR_2O)_xH$, and
    a chainstopper of the formula
    iii) $R_3SiO(SiR_2O)_zSiR_3$,
    where n and x are equal to or greater than 3, z is equal to or greater than zero, and each R in i), ii) and iii) is a one to forty carbon atom monovalent hydrocarbon radical that is independently selected.

12. The process of claim 10 wherein said silicone fluid fed to said reactor comprises:

i) a mixture of cyclic siloxanes selected from the group consisting of
(HRSiO)$_n$, (R$_2$SiO)$_n$, and mixtures thereof;

ii) linear hydrogen siloxanes selected from the group consisting of:
HR$_2$SiO(SiRCH$_3$O)$_y$SiHR$_2$, R$_3$SiO(SiHCH$_3$O)$_y$SiR$_3$ and mixtures thereof; and iii) a chain stopper selected from the group consisting of R$_3$SiO(SiR$_2$O)$_z$SiR$_3$, HR$_2$SiO(SiR$_2$O)$_z$SiR$_2$H, and mixtures thereof;

where each n and each y are equal to or greater than 3, each z is equal to or greater than zero, and R in i), ii), and iii) is a one to forty carbon atom monovalent hydrocarbon radical that is independently selected.

13. The process of claim 11 conducted at a temperature ranging from about 70° to about 150° C.

14. The process of claim 12 conducted at a temperature ranging from about 70° to about 130° C.

15. The process of claim 13 wherein said acid treated clay is montmorillonite.

16. The process of claim 14 wherein said acid treated clay is montmorillonite.

17. The process of claim 15 wherein said low viscosity silicone fluid has a viscosity below about 50 centipoise at 25° C.

18. The process of claim 16 wherein said low viscosity silicone fluid has a viscosity below about 50 centipoise at 25° C.

* * * * *